US012676017B2

(12) United States Patent
Vecchio et al.

(10) Patent No.: US 12,676,017 B2
(45) Date of Patent: Jul. 7, 2026

(54) GENERATING DESCRIPTIVE TAGS FOR IMAGES OF UTILITY ASSETS

(71) Applicant: Florida Power & Light Company, Juno Beach, FL (US)

(72) Inventors: Mackenzie Vecchio, Boca Raton, FL (US); Andre R. Williams, West Palm Beach, FL (US); Richard Bauder, Juno Beach, FL (US); Stephen S. Cross, North Palm Beach, FL (US); Rohan N. Shah, Palm Beach Gardens, FL (US); Kyle A Bush, Palm Beach Garden, FL (US); Paul R. Hynes, Jupiter, FL (US); Eric D Schwartz, Palm Beach Gardens, FL (US); Dmitri Soroka, Royal Palm Beach, FL (US); David J. Sunderman, Loxahatchee, FL (US)

(73) Assignee: Florida Power & Light Company, Juno Beach, FL (US)

(*) Notice: Subject to any disclaimer, the term of this patent is extended or adjusted under 35 U.S.C. 154(b) by 236 days.

(21) Appl. No.: 18/617,099

(22) Filed: Mar. 26, 2024

(65) Prior Publication Data
US 2025/0308269 A1     Oct. 2, 2025

(51) Int. Cl.
*G06V 20/70* (2022.01)
*G06T 3/40* (2024.01)

(52) U.S. Cl.
CPC ............... *G06V 20/70* (2022.01); *G06T 3/40* (2013.01)

(58) Field of Classification Search
CPC .......... G06V 20/70; G06V 20/17; G06T 3/40
See application file for complete search history.

(56) References Cited

U.S. PATENT DOCUMENTS

| | | | | |
|---|---|---|---|---|
| 10,755,357 B1* | 8/2020 | Davis | .................... | G06Q 50/163 |
| 11,361,544 B2* | 6/2022 | Splittstoesser | ......... | G06Q 50/16 |
| 11,792,455 B1* | 10/2023 | Fu | .......................... | G06V 10/82 |
| | | | | 315/297 |
| 12,542,684 B2* | 2/2026 | Brown | ................... | G06Q 10/40 |
| 2017/0092109 A1* | 3/2017 | Trundle | ................... | B60L 53/36 |
| 2017/0270650 A1* | 9/2017 | Howe | .............. | G06F 18/24133 |
| 2018/0247416 A1* | 8/2018 | Ruda | ......................... | G06T 7/13 |
| 2019/0122267 A1* | 4/2019 | Palmer | ................... | G06N 20/00 |
| 2019/0304026 A1* | 10/2019 | Lyman | ................... | G06N 20/00 |

(Continued)

FOREIGN PATENT DOCUMENTS

| | | | | |
|---|---|---|---|---|
| EP | 3696622 A1 * | 8/2020 | ....... | G05B 19/41885 |

*Primary Examiner* — Mia M Thomas
(74) *Attorney, Agent, or Firm* — Fish & Richardson P.C.

(57) ABSTRACT

An image caption generator analyzes a set of images of a region of an environment captured during or after environmental emergency event to provide a set of utility images selected from the set of images that include a utility asset. The image caption generator also generates descriptive tags for the set of utility images. The descriptive tags each characterize a type and a state of a respective utility asset included in a respective image of the set of utility images. A verification engine cross-references the set of utility images with information from an external data source to confirm an accuracy of the descriptive tags for the set of utility images and providing feedback to the image caption generator based on results of the cross-referencing. The image caption generator adjusts the parameters of the ML model based on the feedback to increase accuracy of the descriptive tags.

20 Claims, 9 Drawing Sheets

600

ANALYZING A SET OF IMAGES TO PROVIDE A SET OF UTILITY IMAGES — 605

GENERATING DESCRIPTIVE TAGS FOR THE SET OF UTILITY IMAGES — 610

CROSS-REFERENCING THE SET OF UTILITY IMAGES WITH INFORMATION FROM AN EXTERNAL DATA SOURCE TO CONFIRM THE ACCURACY OF THE DESCRIPTIVE TAGS FOR THE SET OF UTILITY IMAGES — 615

PROVIDING FEEDBACK TO THE IMAGE CAPTION GENERATOR BASED ON THE RESULTS OF THE CROSS-REFERENCING — 620

STORE UTILITY IMAGES IN A DATABASE — 625

GENERATE/AGUMENT AN INDEXED LIST — 630

(56)           References Cited

U.S. PATENT DOCUMENTS

| | | | |
|---|---|---|---|
| 2020/0334459 A1* | 10/2020 | Bermudez | G06N 20/00 |
| 2021/0117678 A1* | 4/2021 | Farre Guiu | G06V 20/20 |
| 2021/0366192 A1* | 11/2021 | Brimhall | G06T 15/06 |
| 2023/0131977 A1* | 4/2023 | Effler | G06T 7/11 |
| | | | 382/254 |
| 2023/0206661 A1* | 6/2023 | Choi | G06N 3/09 |
| | | | 382/156 |
| 2023/0237757 A1* | 7/2023 | Mishra | G06T 7/50 |
| | | | 382/159 |
| 2023/0315979 A1* | 10/2023 | William Rich | G06Q 30/02 |
| | | | 715/234 |
| 2023/0333197 A1* | 10/2023 | Neal | G08B 25/001 |
| 2023/0366695 A1* | 11/2023 | Nagashima | G06F 16/535 |
| 2023/0410436 A1* | 12/2023 | Beauchamp | G06F 3/167 |
| 2025/0078459 A1* | 3/2025 | Gleed | G06F 18/2415 |
| 2025/0348941 A1* | 11/2025 | Greenbaum | G06Q 40/06 |
| 2025/0350100 A1* | 11/2025 | Bush | H02K 41/02 |
| 2025/0356441 A1* | 11/2025 | Oks | G06Q 30/0643 |
| 2025/0371892 A1* | 12/2025 | Vecchio | G06F 16/5866 |

* cited by examiner

400

| INDEX | FLIGHT DATE | UPLOAD DATE | URI | LAT | LONG | ROLL | PITCH | YAW | FEEDER NAME | POLE ID | TAGS |
|---|---|---|---|---|---|---|---|---|---|---|---|
| NUMBER | DATE AND TIME | DATE AND TIME | FILE ADDRESS | NUMBER | NUMBER | NUMBER | NUMBER | NUMBER | NAME AND NUMBER | NUMBER | DELINEATED STRING TEXT |

| No Lean | Pole not Leaning | WD | Wood | TX | Transformer | Veg | |
|---|---|---|---|---|---|---|---|
| Lean | Leaning Pole | CONC | Concrete | SL | Streetlight (Broken/Twisted/Missing) | PMTX FLD | |
| Broken | Broken Pole | STL | Steel | PMDS | Padmount Switch Cabinet | PMDS | |
| No Damage | No Damage seen | | | RS | Riser Shield (Feeder, Primary, and Secondary) | Debris | |
| | | | | CAP BANK | Capacitor Bank | SEC | |
| | | | | FS | Fuse Switch (Blown) | Wire Down | |
| | | | | LA | Surge Arrester Damage (Blown, Offline, or Missing) | X ARM | |
| | | | | ALS | ALS opened/Damaged | INS | |
| | | | | AFS | AFS Damaged | | |

GENERATING DESCRIPTIVE TAGS FOR IMAGES OF UTILITY ASSETS

TECHNICAL FIELD

The present disclosure relates to image processing and more particularly to systems and methods for generating descriptive tags for captured images.

BACKGROUND

In the realm of emergency management and response, there is a need for the rapid and accurate assessment of damage following natural disasters. The ability to process and analyze large volumes of imagery data, such as photographs from drones, smartphones, and fixed cameras, is useful for identifying hazards, evaluating the extent of damage and prioritizing response efforts. Conventionally, this process has relied heavily on manual review and annotation of images, a method that is both time-consuming and susceptible to human error, particularly when dealing with the sheer scale of data generated during such events.

The advent of machine learning (ML) technologies has introduced the potential for significant improvements in this area. ML models have been developed to automate the analysis of visual data. These models can be trained to recognize patterns, classify objects and extract meaningful information from images.

SUMMARY

One example relates to a non-transitory machine-readable medium having machine-readable instructions. The machine-readable instructions include an image caption generator causing at least one processor to execute operations based on parameters of an ML model, the operations of the image caption generator include analyzing a set of images of a region of an environment captured during or after an environmental emergency event to provide a set of utility images selected from the set of images that include a utility asset. The operations for the image caption generator also include generating descriptive tags for the set of utility images. The descriptive tags each characterize a type and a state of a respective utility asset included in a respective image of the set of utility images. The machine-readable instructions also include a verification engine causing the at least one processor to execute operations, the operations for the verification engine include cross-referencing the set of utility images with information from an external data source to confirm an accuracy of the descriptive tags for the set of utility images and providing feedback to the image caption generator based on results of the cross-referencing. The image caption generator adjusts the parameters of the ML model based on the feedback to increase accuracy of the descriptive tags.

A second example relates to a system for analyzing images, the system includes a non-transitory memory for storing data and machine-readable instructions and a processor for accessing the non-transitory memory and executing the machine-readable instructions. The machine-readable instructions include an image preprocessor for receiving a set of images of a region of an environment captured during or after an environmental emergency event from a plurality of sources. The machine-readable instructions also include an image caption generator employing an (ML) model for analyzing the set of images to identify a set of utility images selected from the set of images that include a utility asset and generating descriptive tags for the set of utility images. The descriptive tags each characterize a type and a state of a respective utility asset included in a respective image of the set of utility images. The machine-readable instructions include a database for storing the set of utility images and associated descriptive tags and a verification engine for cross-referencing the images of the set of utility images with external GIS (geographic information system) data to confirm an accuracy of the descriptive tags of the set of utility images and to provide feedback to the image caption generator for adjustment of parameters of the ML model.

A third example relates to method for processing images including analyzing, by an image caption generator executing on one or more computing platforms a set of images of a region of an environment captured during or after an environmental emergency event to provide a set of utility images selected from the set of images that include a utility asset. The analyzing is based on parameters of an ML (machine learning) model employed by the image caption generator. The method includes generating, by the image caption generator, descriptive tags for the set of utility images. The descriptive tags each characterize a type and a state of a respective utility asset included in a respective image of the set of utility images. Moreover, the generating is based on the parameters of the ML model. The method includes cross-referencing, by a verification engine executing on the one or more computing platforms, the set of utility images with information from an external data source to confirm an accuracy of the descriptive tags for the set of utility images. The method also includes providing feedback, by the verification engine, to the image caption generator based on results of the cross-referencing. The image caption generator adjusts the parameters of the ML model based on the feedback to increase accuracy of the descriptive tags.

BRIEF DESCRIPTION OF THE DRAWINGS

FIG. 4A illustrates an example of a schema for an indexed list.

FIG. 4B illustrates a table that has examples of text codes.

DETAILED DESCRIPTION

Figure 1:
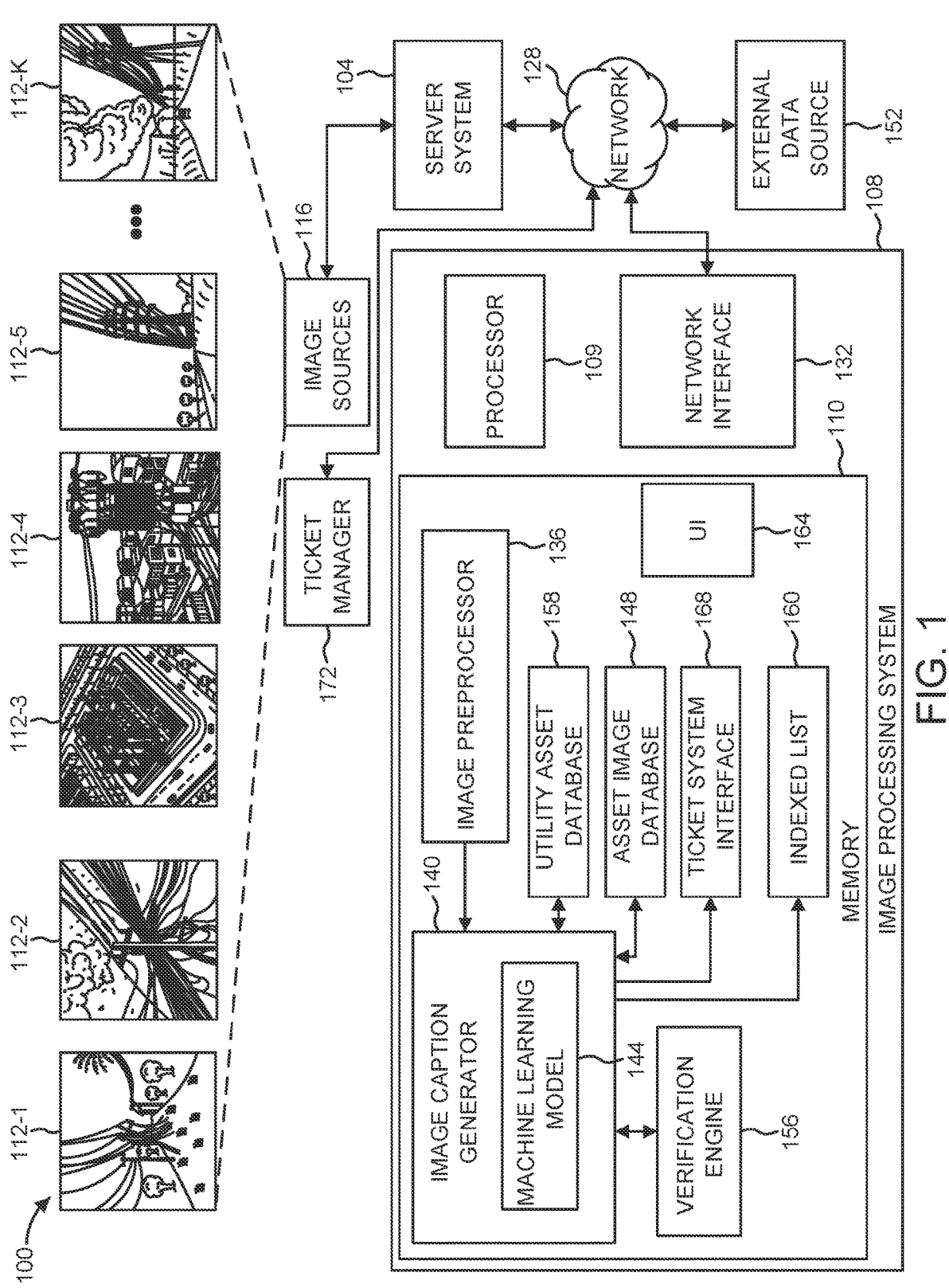
FIG. 1 illustrates a system for generating descriptive tags of images.

This description relates to an image caption generator with a machine learning (ML) model that is employable to analyze images captured during and after an environmental emergency event, such as a weather event (e.g., a hurricane or tornado) or a geothermal event, such as an earthquake. The images can be captured from a smart phone, a tablet computer, a drone (e.g., a camera mounted on the drone), a fixed camera (e.g., for a security system), etc.

The ML model can be trained from a neural network, such as a transformer neural network or other ML algorithm. The ML model is trained to convert input images into vectors (e.g., a matrix of numbers) and to add a descriptive tag (e.g., text) for each input image. In some examples, the tag for the input image can be stored in an indexed filed (e.g., a spreadsheet) that can include a unique ID (identifier) for indexing to a copy of the input image. In some examples, the ML model can also assign a confidence score to each descriptive tag characterizing a likely accuracy for the descriptive tag.

As an example, suppose that the ML model is provided an image of a flooded road, and the ML model can add a descriptive tag that identifies the flooded road and the location of the flooded road. In another example, the input image can include a downed power line, and the descriptive tag can indicate that a downed power line is located at a corresponding location.

In some examples, the input image of the image caption generator can include location data (e.g., metadata) that characterizes a location (e.g., geographical coordinates) where the input image was captured. This data can be used by the verification engine to analyze the descriptive tags that have a confidence score below a threshold value (e.g., 0.8 as one example). The verification engine can access external databases, such as a global information system (GIS) database, a map database, a power layout database, etc. The verification engine can query these databases for features known in the location characterized in the location data of the input image. The verification engine can analyze the descriptive tag and the features of the location (extracted from the external source) to determine an accuracy of the descriptive tag. For instance, consider the situation where the descriptive tag indicates that the input image characterizes a flooded road, as noted above. Now suppose that the external database has map data for a location of the input image, and at that location, there is no road. Thus, the verification engine can determine that the descriptive tag is inaccurate and provide an indication of this inaccuracy to the ML model (executing on a neural network), which is used to tune the ML model (e.g., adjust parameters) to improve an accuracy of the ML model.

Further, the verification engine can additionally add another descriptive tag based on the data extracted from the external sources. Consider the example where the input image has a descriptive tag indicating that the input image illustrates a downed power line. In this situation, the verification engine can query the power layout database to verify that a power line is present at the location. Additionally, after this verification is completed, the verification engine can add an ID (identifier), such as a feeder ID descriptive tag for the input image. In this example, the feeder ID is employable for a service crew attempting to identify a substation or distribution transformer that the power line (a feeder line) in the input image needs to be connected with.

A user interface module can provide a portal (e.g., a web portal) for retrieving the images and the associated descriptive tags. In some examples, a user of a ticket system can access the portal to identify images in a particular area that have particular descriptive tags. For example, the user can query the portal for captured images associated with a particular building or type of work (e.g., vegetation, power line, etc.).

Further, in some examples, a ticket interface system can generate an investigation request for a ticket manager based on the descriptive tags and location associated with the captured images. For example, consider again the situation where the descriptive tags associated with the input image identifies a downed power line, a location of the downed power line and the feeder ID. In this situation, the ticket manager can generate a service ticket for a service crew (e.g., a power line service crew) to deploy the service crew the location to expeditiously remedy the problem in response to receiving an investigative request.

By employing the ML model, the need to manually add descriptions to thousands (or hundreds of thousands) of images captured during or after an environmental emergency event is obviated. Instead, the ML model automatically adds the descriptive tags. Additionally, the verification engine can improve the accuracy of the ML model and add additional descriptive tags that can help a service crew remedy a situation.

FIG. 1 illustrates a system 100 for adding descriptive tags to images. In some examples, the images are captured during or after an environmental emergency event, such as a weather event (e.g., a hurricane, a flood, a tsunami, a tornado, etc.) or a geothermal event (e.g., an earthquake, a volcano eruption, etc.). The system 100 includes a server system 104 and an image processing system 108. The server system 104 can be implemented as one or more computing devices, such as one or more servers that execute application software on top of an operating system. That is, the server system 104 may be implemented as a combination of hardware and software. The server system 104 is configured to receive K number of images 112 from a plurality of image sources 116, where K is an integer greater than or equal to two (2). The images 112 are provided as image 112-1 (e.g., a leaning electrical pole proximal a flooded road), image 112-2 (e.g., a damaged transformer), image 112-3 (e.g., a ariel view of a substation), image 112-4 (e.g., a transformer in a residential area) image 112-5 (e.g., a feeder extending near a road) and image 112-K (e.g., a damaged feeder near a road). The image sources 116 represent a variety of types of images sources, including drones, smart phones, security cameras or any other type of image capturing device.

In some examples, the server system 104 can represent multiple servers, such as web servers, drone controlling servers, etc. that are employable to relay images captured by the image sources 116 to the image processing system 108. The server system 104 represents a computing platform, such as one or more servers that execute application software on top of an operating system.

The image processing system 108 can be implemented as a computing platform, such as one or more servers that execute application software on top of an operating system. That is, the image processing system 108 can include a processor 109 (e.g., one or more processing cores) and a non-transitory memory 110 that stores machine-readable instructions. The non-transitory memory 110 is implemented as a non-transitory machine-readable medium (volatile and/or non-volatile memory), such as random access memory (RAM), a hard disk drive, a solid state drive, flash memory or a combination thereof. The processor 109 can access the non-transitory memory 110 and execute machine-readable instructions. That is, execution of the machine-readable instructions causes the processor 109 to perform specific operations.

In some examples, the server system 104 and the image processing system 108 can communicate over a network 128 (e.g., a public network, such as the Internet or a proprietary network, such as a utility network) through a network interface 132 of the image processing system 108. In other examples, the server system 104 and the image processing system 108 can be integrated and operate on the same computing system. The image processing system 108 and/or the server system 104 could be implemented in a computing cloud. In such a situation, features of the image processing system 108 and/or the server system 104, such as the processor 109, the network interface, and the memory 110 could be representative of a single instance of hardware or multiple instances of hardware with applications executing across the multiple of instances (i.e., distributed) of hardware (e.g., computers, routers, memory, processors, or a combination thereof). Alternatively, the image processing system 108 and/or the server system 104 could be implemented on a single dedicated server.

The K number of images 112 represents images of an environment captured during or after a environmental emergency event, such as a hurricane, a snow storm, a rain/thunderstorm, a tornado, etc. Some (e.g., a first subset) of the K number of images 112 may include images of a utility asset, such as feeder lines, transformers, substations, residential power lines, etc. Additionally, some (e.g., a second subset) of the K number of images 112 do not include a utility asset.

The K number of images 112 are received by an image preprocessor 136 stored in the memory 110. The image preprocessor 136 is configured to normalize the K number of images 112. The normalization of the K number of images can include, for example, resizing the images (e.g., changing a resolution and/or cropping images) to a uniform size, converting the images to a common format, etc. The normalization of the K number of images 112 ensure that the K number of images 112 have uniform features (e.g., a uniform size, a uniform resolution, etc.). In particular, as noted, the image sources 116 represent multiple different image sources, and these different images sources can capture images with different resolutions, different viewing angles, etc. However, the normalization executed by the image preprocessor 136 modifies the images in a manner to curtail an impact of these differences.

The image preprocessor 136 provides the (normalized) K number of images 112 to an image caption generator 140. The image caption generator 140 includes an ML model 144. The ML model 144 analyzes the K number of images 112 to select the first subset of images, namely, the images that include a utility asset, and the first subset of images can be referred to as a set of utility images, and there are at least two images in the set of utility images. In many examples, there could be thousands, hundreds of thousands or even millions of utility images in the set of utility images. The second subset of images of the K number of images 112 (images that do not contain a utility asset) are discarded or otherwise ignored by the image caption generator 140.

Some of the utility images can include metadata, such as location information. The location information can be implemented, for example, as geographical coordinates (e.g., latitude and longitudinal coordinates). Additionally, the metadata can include time data that characterizes a date and time that an image was captured. Further, in some examples, metadata of the utility images can include information about the image source 116 employed to capture a particular device. For instance, in situations where a particular utility image is captured with a smartphone, the metadata could include a make and model number of the smartphone used to capture the utility image. Similarly, in situations where a particular utility image is captured by a drone, the metadata can include information about the make and model of the drone and a flight date and time the drone was deployed to capture the particular utility image. Further, information related to a physical orientation of a gimble for a camera of the drone, a pitch, yaw and roll of the camera of the drone at the time the particular utility image is captured can be included as metadata. Additionally, in some examples, the image caption generator 140 can flag utility images that lack location information, such that the location information can be added manually (or through another operation).

Figure 2:
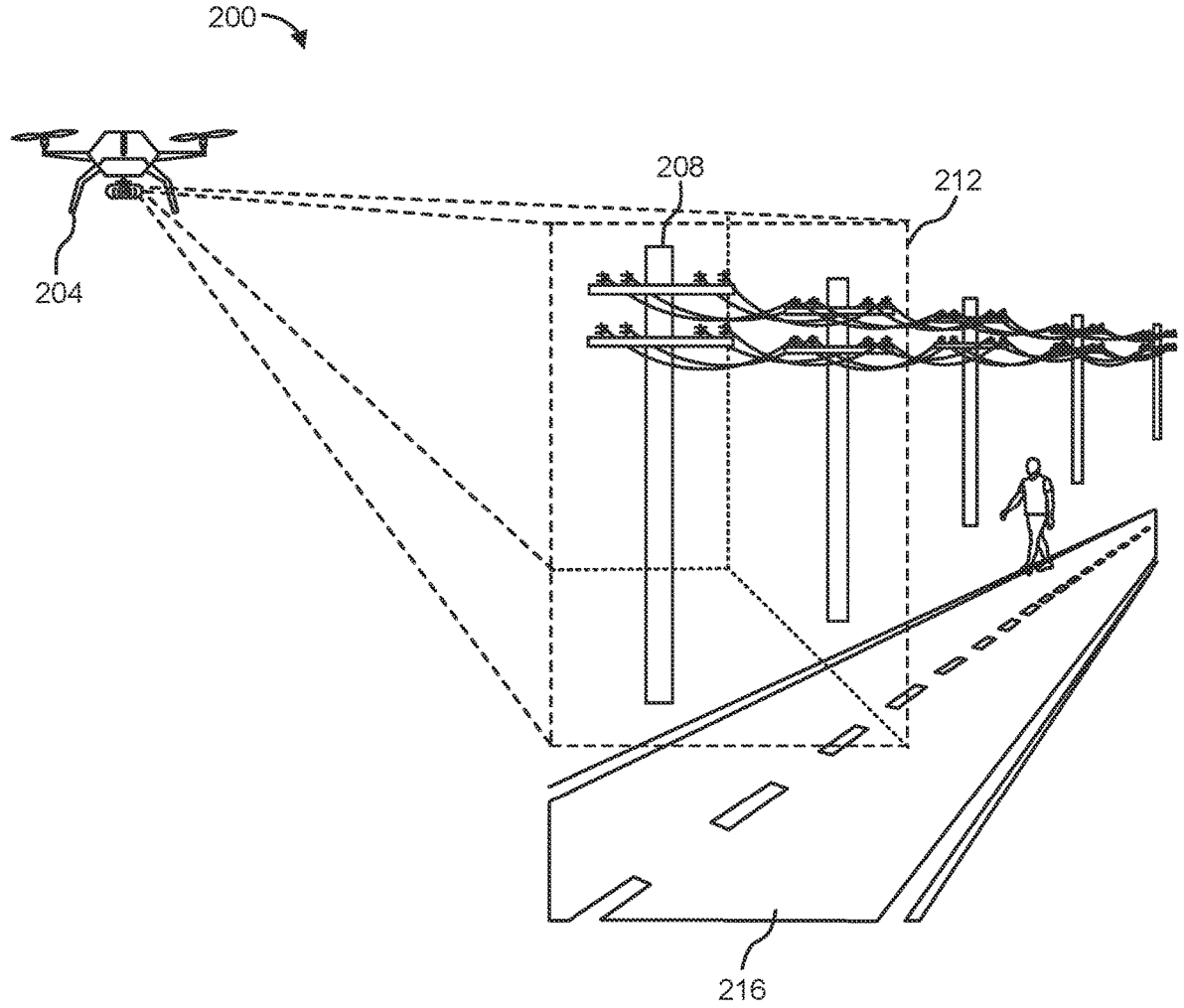
FIG. 2 illustrates an example of an environment where a drone captures a utility image.

FIG. 2 illustrates an example of an environment 200 where a drone 204 captures a utility image (e.g., one of the K number of images 112 of FIG. 1). The environment 200 includes a utility asset 208, namely a utility pole (alternatively referred to as an electrical pole, a telephone pole, etc.). The drone 204 captures an image of the utility asset 208. More specifically, the drone 204 captures a region bounded by a box 212 that includes the utility asset 208. Thus, the resultant utility image captured by the drone 204 includes the utility asset 208, as well as a portion of a road 216.

In the example illustrated, the utility image captured by the drone 204 could include metadata with a camera gimble orientation (e.g., roll, pitch and yaw), along with location information, such as GNSS (global navigation satellite system) data (e.g., latitude and longitude coordinates) for the drone 204. In various examples, the GNSS data can be implemented with GPS (global positioning system) data, GLONASS data, etc.

Referring back to FIG. 1, to determine if a particular image 112 is a utility image, consider analysis of the utility image captured in FIG. 2, the image captured by the drone 204 can include metadata that has the camera orientation and the location information for the drone 204. In such a situation, the image caption generator 140 can, among other things, combine the location information with the camera orientation to calculate an oriented field-of-view as a 3D (three-dimensional) polygon. The 3-D polygon is employed by the image caption generator 140 to search the asset image database 148 that includes images of electrical poles and similar equipment or public databases of an external data source 152 such as a database of roads to determine what structures are present in a particular utility image. Additionally or alternatively to the approach employing 3D polygons, the image caption generator 140 can be programmed to execute a simple radius search based on a set distance from a center point of a particular utility image to identify the utility asset in the image.

In situations where a match for a particular image 112 can be identified, the particular image is tagged as a utility image. In examples where no such match is found, the particular image can be discarded by the image caption generator 140. Additionally, the image caption generator 140 employs the ML model 144 to generate a descriptive tag (alternatively referred to as a caption) for the utility images of the set of utility images. The ML model 144 is trained with images of utility assets in various states (operational, damaged, non-functional, etc.). In some examples, these images employed to train the ML model 144 are stored in the asset image database 148 that is searchable by the ML model 144. Moreover, the ML model 144 of the image caption generator 140 can employ the metadata associated with a particular utility image, including the location information and/or the orientation of the image sources 116 to generate the descriptive tag for the corresponding utility image. The descriptive tag of a particular utility image can characterize a type (e.g., an electrical pole, a transformer, a feeder, etc.) and a state (e.g., functional, damaged, leaning, etc.) of a particular utility asset visible in the particular utility image.

Figure 3:
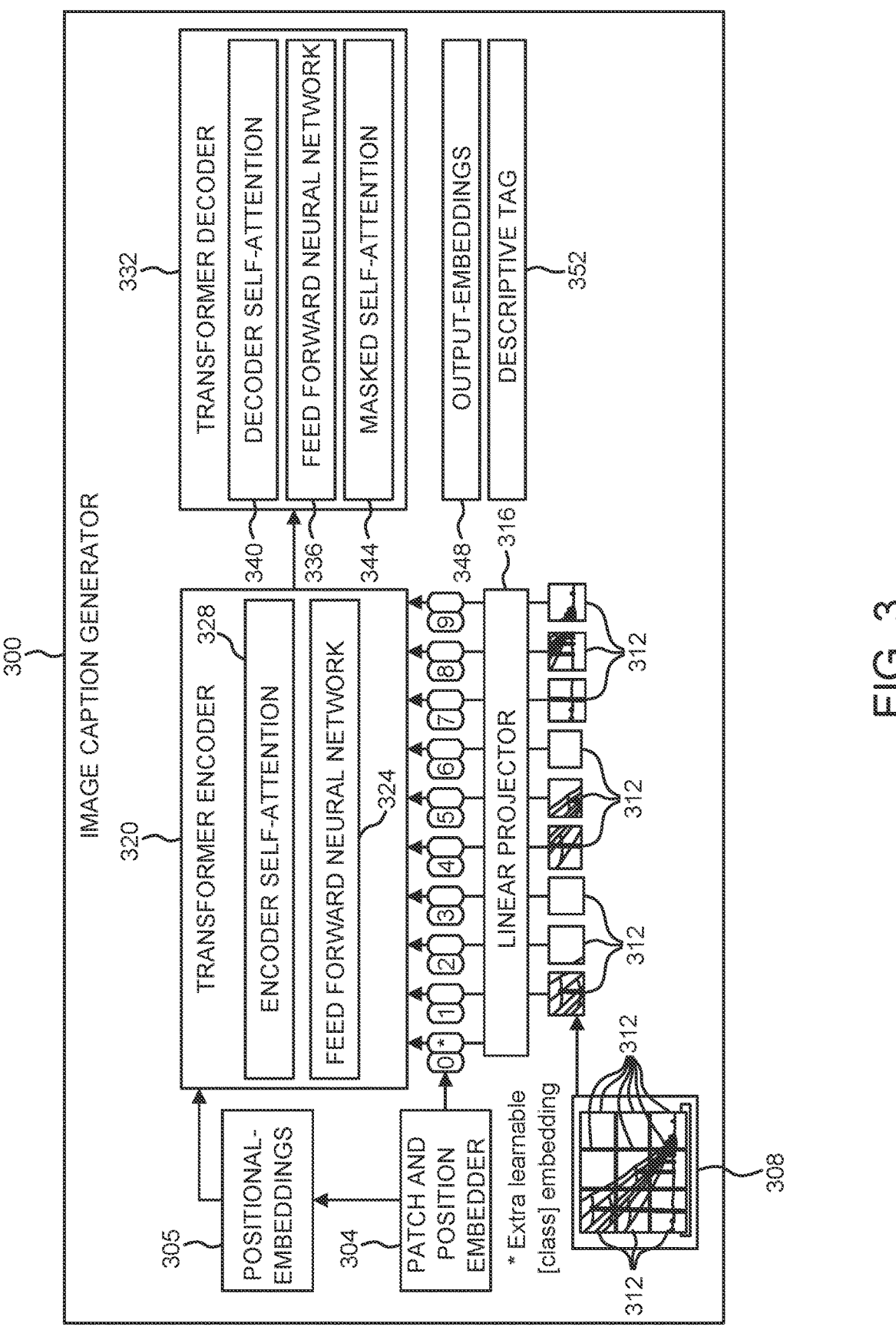
FIG. 3 illustrates a detailed diagram of an encoder/decoder portion of an image caption generator.

The ML model 144 of the image caption generator 140 can be implemented with a transformer-based neural network with an encoding component for converting images (e.g., the utility images) into numerical vectors and a decoding component for converting the numerical vectors into descriptive text for the descriptive tags. FIG. 3 illustrates a detailed diagram of a transformer-based neural network and the encoder/decoder portion of an image caption generator 300 that is employable to implement a portion of the image caption generator 140 of FIG. 1.

The image caption generator 300 includes a patch and position embedder 304 that receives an input image 308, such as one of the K number of images 112 of FIG. 1. The patch and position embedder 304 divides the input image 308 into patches 312. The patch and position embedder 304 flattens the patches 312 and linearly transforms the patches 312 into an embedding space.

As used herein, the embedding space refers to a continuous vector space in which high-dimensional data, (e.g., the input image 308) is transformed into lower-dimensional vectors. This transformation is designed to capture and preserve semantic relationships or features of the input image 308 in a manner that can be more easily processed and analyzed by ML algorithms. In an embedding space, each item or data point is represented as a vector, and the distance between vectors is intended to reflect the similarity or dissimilarity between the corresponding items. The embedding space enables operations on complex and abstract data types using standard vector arithmetic. The image caption generator 300 can leverage this benefit for identifying objects in the input image 308.

The patch and position embedder 304 adds the location information and/or the camera orientation (if available) to the embedding space for the input image 308 to maintain the spatial relationships between the patches 312. This obviates the need for the patch and position embedder 304 to include any inherent notion of order or position of the patches 312. This association of location data with imagery is a technique employable to automatically assign metadata and/or descriptive tags to the input image 308 (or other images) which are employable to validate ML findings and/or the descriptive tags. The patch and position embedder 304 generates positional embeddings 305 for vectors that encode the position of a patch 312 within a sequence. The positional embeddings 305 are employable to give an ML model information about an order of the patches 312.

The embedding space for the (flattened) patches 312 of the input image 308 are provided to a linear projector 316. The linear projector 316 projects the flattened patches 312 linearly to match a dimensionality expected by a transformer encoder 320. This linear projection executed by the linear projector 316 provides a learned transformation that prepares the data of the input image 308 for processing by an ML model employed by the transformer encoder 320 (e.g., the ML model 144 of FIG. 1). The positional embeddings 305 are also provided to the transformer encoder 320.

The transformer encoder 320 includes a series of self-attention and feed-forward neural network layers. More specifically, the transformer encoder 320 includes an encoder self-attention layer 324 and a feed-forward neural network 328 (a trained ML model). The transformer encoder 320 processes a sequence of the flattened patches 312 (in the embedding space) by allowing each patch 312 to attend to the other patches (or some subset thereof), to capture global dependencies. The transformer encoder 320 outputs a sequence of encoded representations of the input image 308 that are rich in contextual information.

More specifically, the transformer encoder 320 handles sequential data for natural language processing (NLP). The encoder self-attention layer 324 (which can represent multiple layers) is responsible for modeling relationships between patches 312 in the input sequence. In self-attention, each patch 312 is able to attend to all other patches 312 in the input image 308, thereby enabling the model to capture context and dependencies regardless of a position of a particular patch 312. The encoder self-attention layer 324 computes attention scores that determine the influence of other patches 312 on a particular patch 312, effectively allowing the ML model of the transformer encoder 320 to weigh the importance of each patch 312 when producing the next representation of the patches 312.

The output of the encoder self-attention layer 324 is provided to the feed-forward neural network 328. This feed-forward neural network 328 includes two linear transformations with a non-linear activation function in between. The feed-forward neural network 328 operates on each position of the patches 312 separately and identically. Accordingly, the same feed-forward neural network 328 is applied to each position of the patches 312. The transformer encoder 320 thus transforms the input sequence into a series of output vectors that encapsulate both the individual elements and their contextual relationships, readying the data for text generation (e.g., a descriptive tag).

The output of the transformer encoder 320 is provided to a transformer decoder 332. The transformer decoder 332 is tasked with generating a descriptive tag (a caption) for the input image 308 from the encoded image representations. The transformer decoder 332 includes a feed-forward neural network 336, a decoder self-attention layer 340 and a masked self-attention layer 344.

The decoder self-attention layer 340 in a transformer decoder serves a similar purpose as the feed-forward neural network 328 of the transformer encoder 320. The decoder self-attention layer 340 allows each patch 312 to attend to previous tokens (e.g., units of text) in the sequence, facilitating the modeling of relationships and dependencies between tokens. In summary, the decoder self-attention layer 340 attends to the output of the transformer encoder 320, thus integrating the image context into the language model.

The feed-forward neural network 336 (a trained ML model) operates similar to the encoder self-attention layer 324 of the transformer encoder 320. The feed-forward neural network 336 transforms the attention output to help in predicting the next word in the caption. More generally, the feed-forward neural network 336 applies a position-wise, non-linear transformation to each token representation output by the decoder self-attention layer 340 after a particular token has been processed by the decoder self-attention layer 340. The output of the tokens from the attention mechanisms is independently passed through the feed-forward neural network 336, which has two linear layers with a non-linear activation function in between, typically expanding and then compressing the dimensions of the representations of the tokens. This process introduces additional complexity and depth to the ML model, enabling the capture of more intricate patterns in the data. The feed-forward neural network 336 operations are augmented by residual connections and layer normalization, which help in stabilizing the training of deep networks. The transformed representations from the feed-forward neural network 336 are employed to generate a final output sequence, contributing to an ability of the transformer decoder 332 to produce accurate and coherent text.

The output of the feed-forward neural network 336 is provided to the masked self-attention layer 344. The masked self-attention layer 344 enables the transformer decoder 332 to attend to all positions up to and including the current position in the output sequence. This attendance prevents future information from leaking into the prediction of the current word during training. The transformer decoder 332 outputs output-embeddings 348 that are the transformed representations of the words that have been predicted so far. The transformer decoder 332 also outputs a descriptive tag 352 that presents a final generated caption for the input image 308 based on the output embeddings 348 and the masked self-attention layer 344. The descriptive tag can, for example, characterize type and state of a utility asset visible in the input image 308.

Referring back to FIG. 1, as noted, the image caption generator 140 generates the descriptive tag for the utility images. Additionally, in some situations, the image caption generator 140 also generates a confidence score for the descriptive tag. The confidence score represents a predicted accuracy of the descriptive tag. If the confidence score is below a threshold value for a particular utility image, the image caption generator 140 provides the particular utility image to a verification engine 156 stored in the memory 110. Thus, in some examples, a subset (such as a proper subset) of the utility images are provided to the verification engine 156. In other examples, the image caption generator 140 provides the verification engine 156 with each utility image for verification.

The verification engine 156 cross-references the descriptive tag for the particular utility image with information from the external data source 152 to confirm the accuracy of the descriptive tags for the set of utility images. In this situation, the external data source 152 can represent a GIS database with information related to the position of infrastructure. The GIS data can include elevation models and topography information. For instance, suppose that a descriptive tag assigned to a particular utility image describes an electrical pole having fallen onto a bridge. However, the location data associated with the particular utility image identifies a location where there is no bridge (e.g., an open field). In that situation, the particular image is marked as inaccurate, and the verification engine 156 provides feedback to the image caption generator 140 indicating the inaccuracy of the descriptive tag based on the cross-referencing. Alternatively, in continuing with the same example, if the GIS data indicates that a bridge is proximal to the position identified in the location information for the particular image, the verification engine 156 provides feedback indicating that the descriptive tag is accurate. In either such situation, the image caption generator 140 can employ the feedback to adjust (tune) parameters of the ML model 144 to increase an accuracy of the ML model 144. Thus, over time, the operational performance of the image caption generator 140 improves.

In some examples, the verification engine can augment the utility images with metadata based on data stored in a utility asset database 158. The utility asset database 158 includes data characterizing utility assets along with a location of the utility asset. The image caption generator 140 can determine if a particular utility asset (e.g., by name, number, etc.) is characterized in a particular utility image based on the location data associated with the utility image. For instance, suppose that the particular utility image corresponds to image 112-1, which illustrates an leaning electrical pole. In this instance, the verification engine 156 can examine the location information for the particular utility image and determine a particular electrical pole (number) by searching the utility asset database 158 for a utility asset that is proximal to the location characterized in the location information. Additionally, a record in the utility asset database 158 associated with the particular utility asset can identify a feeder name and number that provides electrical power to the wires of the particular utility asset (e.g., a feeder that provides power to the electrical pole). In other examples, other types of metadata can be added. The verification engine 156 can return the utility images with the augmented metadata to the image caption generator 140.

The image caption generator 140 can store the utility images in the asset image database 148 along with a unique ID (identifier). The image caption generator 140 also generates and/or updates an indexed list 160. The indexed list includes the unique ID of the utility images, the metadata (or some portion thereof), along with the descriptive tags. The indexed list can be, for example, a spreadsheet, such as a CSV (commas separated variable) file, an Office Open XML (extensible markup language) file, a spreadsheet file in a proprietary format, etc. In some examples, each unique ID (e.g., a row in the indexed list) can include a link to the asset image database 148 to facilitate retrieval of the corresponding utility image.

FIG. 4A illustrates an example of a schema 400 for an indexed list, such as the indexed list 160 of FIG. 1. The schema includes the unique ID, labeled as "index". The unique ID is a key field that is employable to search an asset image database, such as the asset image database 148 of FIG. 1. The schema 400 also includes a first set of metadata fields 404 that characterizes features related to the utility image itself, such as characteristics of the device employed to capture the utility image, the date/time the image was taken, etc. The schema 400 includes a second set of metadata fields 408. The second set of metadata fields 408 includes metadata added by a verification engine (e.g., the verification engine 156 of FIG. 1). The second set of metadata fields 408 includes metadata related to the utility asset present in a particular utility image. In other examples, the other types of data fields could be present in the first set of metadata fields 404 and/or the second set of metadata fields 408. Further, the schema 400 includes a descriptive tag labeled "TAG" that is implemented with delineated text generated by an image caption generator (e.g., the image caption generator 140 of FIG. 1). By use of the schema 400, an indexed list implemented with this schema 400 would enable retrieval of a particular utility image, along with the fields included in the first set of metadata fields 404 and the second set of metadata fields 408.

FIG. 4B illustrates a table 450 that has examples of text codes (e.g., abbreviations) that could be included in the descriptive tag added to the index list (e.g., in the "TAG" field). The text codes can include failure states for utility assets. The particular examples provided in the table 450 is not meant to be exhaustive. In other examples, there could be more or less such text codes.

Referring back to FIG. 1, the memory 110 includes a user interface module 164 that can provide a user interface (such as a web portal or other graphical user interface) for searching the asset image database 148 and/or the indexed list 160. The user interface provided by the user interface module 164 can display images on a map based on the location information and to allow users to filter images by specific types of damage and/or infrastructure elements identified in the descriptive tags of the set of utility images.

The user interface enables search criteria based on an employee role, and the user interface provides images of the set of utility images and associated data relevant to the employee role. More particularly, the user interface facilitates searches within the asset image database 148 and/or the indexed list 160. The user interface module 164 offers searchable/filterable fields that permit user input for locating utility assets by specifying information such substations, feeder numbers, or geographical identifiers including addresses or zip codes. Stated differently, the user interface enables filtering the indexed list 160 and/or records on the asset image database 148 based on specific criteria related to the descriptive tags and location information embedded in the utility images. Upon entry of such criteria, the user interface module 164 accesses the indexed list 160 to extract metadata and a unique identifier corresponding to utility images that meet the search parameters. Additionally, the user interface module 164 accesses the asset image database 148 to retrieve utility images linked to the unique identifier. The metadata, or a selected subset thereof, along with descriptive tags and the utility images, are displayed on the user interface provided by the user interface module 164.

Additionally, in some examples, the user interface module 164 can access the external data source 152 for geographic images, such as street view images, satellite images of a geographic region, etc. These images can be output in addition to (or instead of) the utility images in some situations.

Figure 5A:
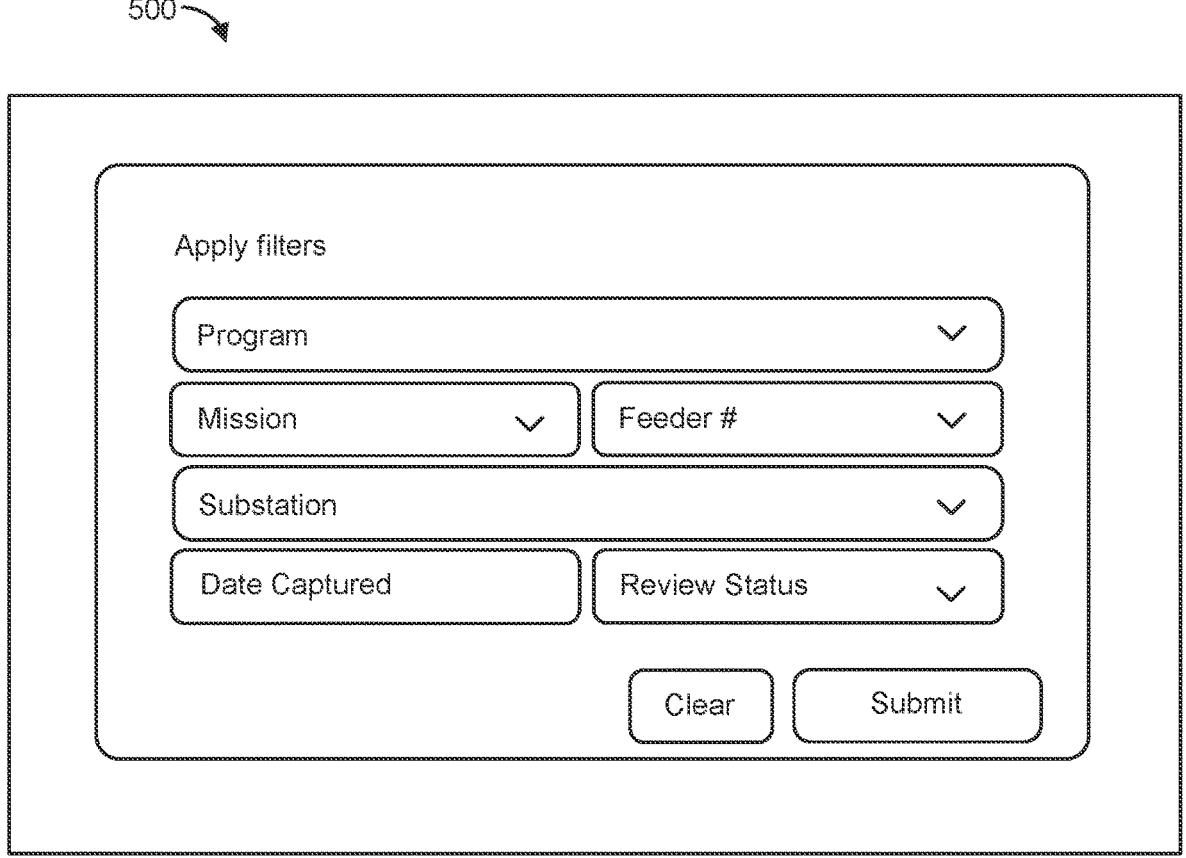
FIGS. 5A-5D illustrate an example of a user interface that provides search fields.
Figure 5B:
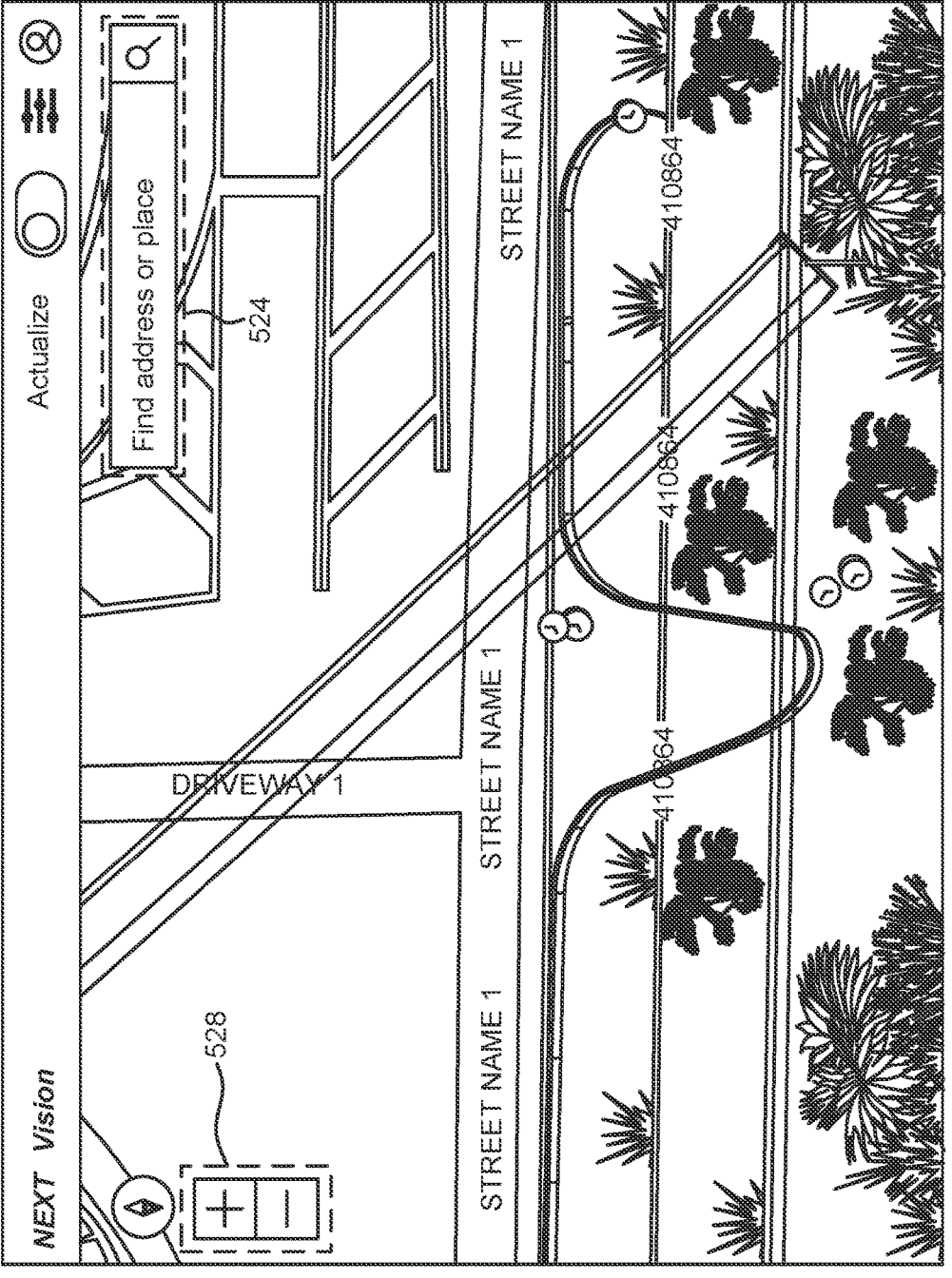
Figure 5C:
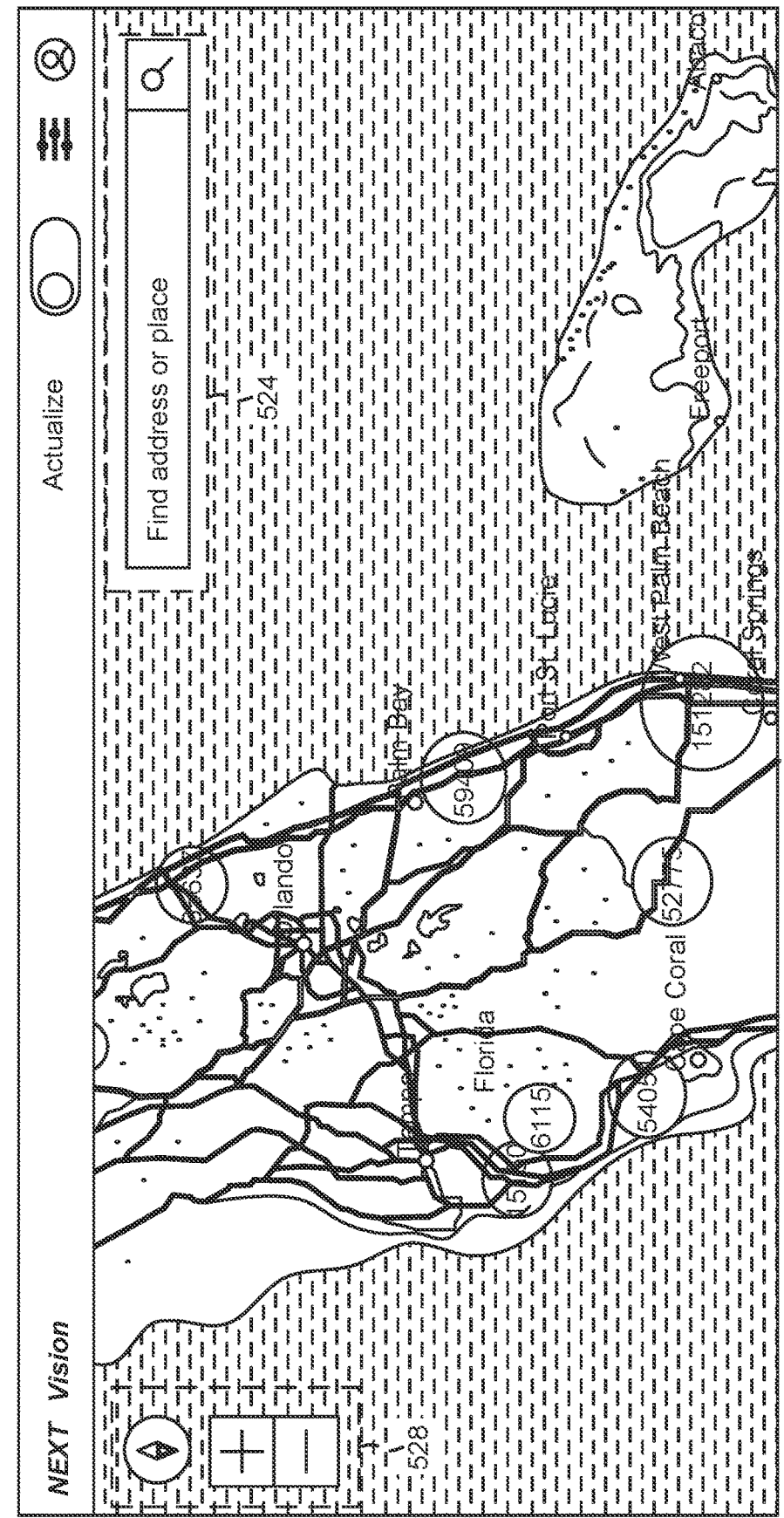
Figure 5D:
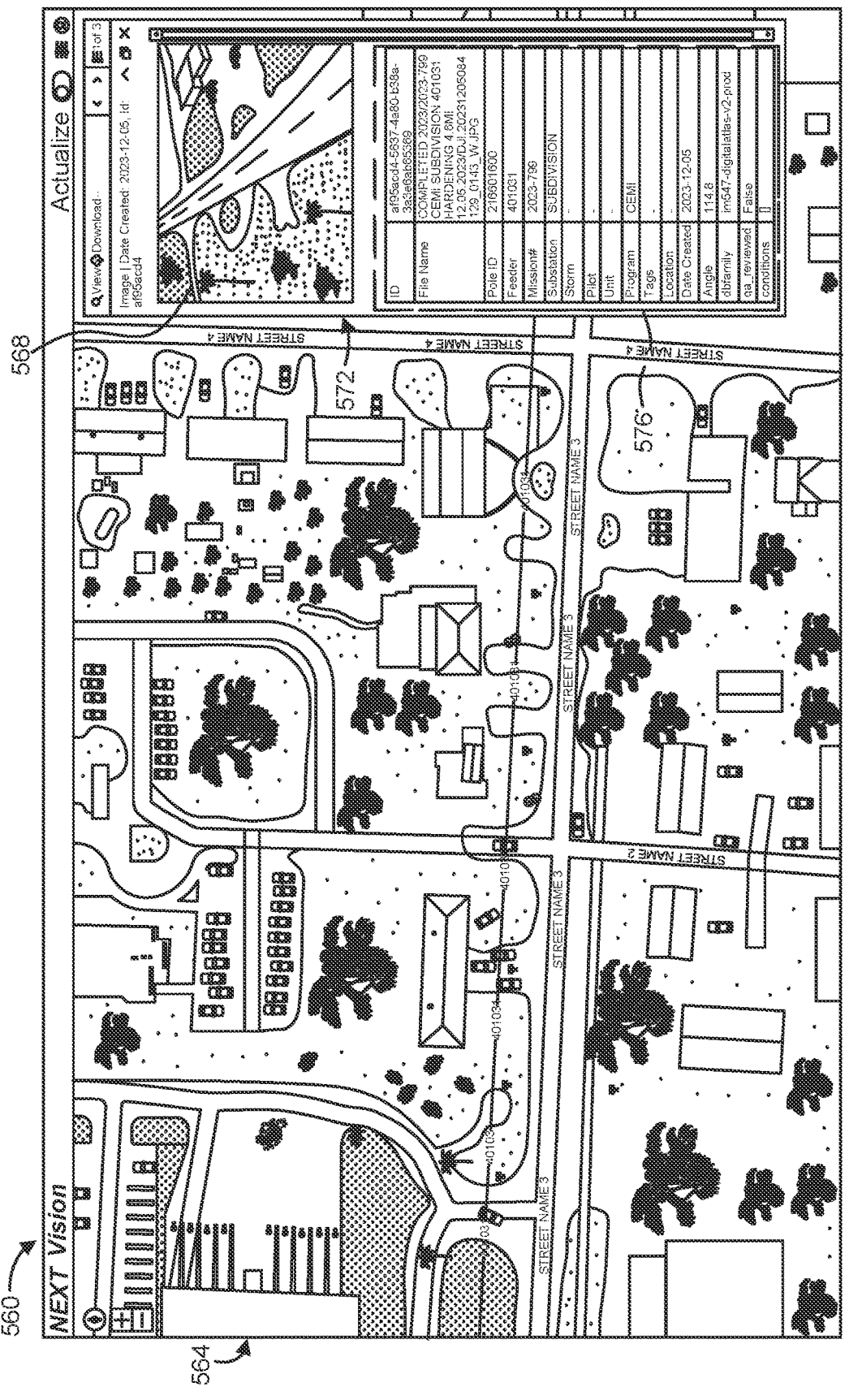

FIGS. 5A-5D illustrates an example of a user interface that provides search fields. The user interface is employable to implement the user interface provided by the user interface module 164 of FIG. 1. FIG. 5A illustrates a dashboard 500 for the user interface that includes searchable fields that apply filters. In the example illustrated, suppose that a particular feeder number is selected. In response, an image of the feeder with the selected feeder number is provided as a first output image 520 in FIG. 5B. The first output image 520 includes a location search field 524 that is employable to update the search. Additionally, the first output image 520 includes controls 528 that provide the option to pan or zoom to change an area of view. In particular, suppose that a "zoom out" option is selected. In this situation, a second output image 540 can be provided, as illustrated in FIG. 5C a wider geographic region (e.g., a map) is displayed in the second output image 540. The image of the wider geographic region (e.g., a satellite image) in the second output image 540 can be provided from an external data source. The second output images includes the location search field 524 and the controls 528. Suppose that a specific address is provided to the location search field 524. In such a situation, a third output image 560 can be provided, as illustrated in FIG. 5D.

The third output image 560 includes a satellite image 564 and a utility image 568. The third output image 560 includes the controls 528. Moreover, the utility image 568 is output in a window 572 that includes metadata 576 for the utility image. In this manner, the status of a utility asset (e.g., an electrical pole) can quickly be ascertained by a user of the user interface.

Referring back to FIG. 1, in some examples, for a particular utility image, the descriptive tag can indicate that a particular utility asset has a failure state (e.g., from the text codes in the table 450 of FIG. 4B), the image caption generator 140 can provide the particular utility image to a ticket system interface 168. The ticket system interface 168 can include a module (e.g., an API (application programming interface)) to communicate with a ticket manager 172 through the network 128. The ticket manager 172 can generate trouble tickets to deploy service crews for maintenance of specified utility assets. Responsive to the particular utility asset, the ticket system interface 168 can automatically generate an investigation request for the ticket manager 172. In some examples, the ticket manager 172 can automatically generate a trouble ticket in response to the investigation request. In other examples, a review/approval procedure may be employed.

Figure 6:
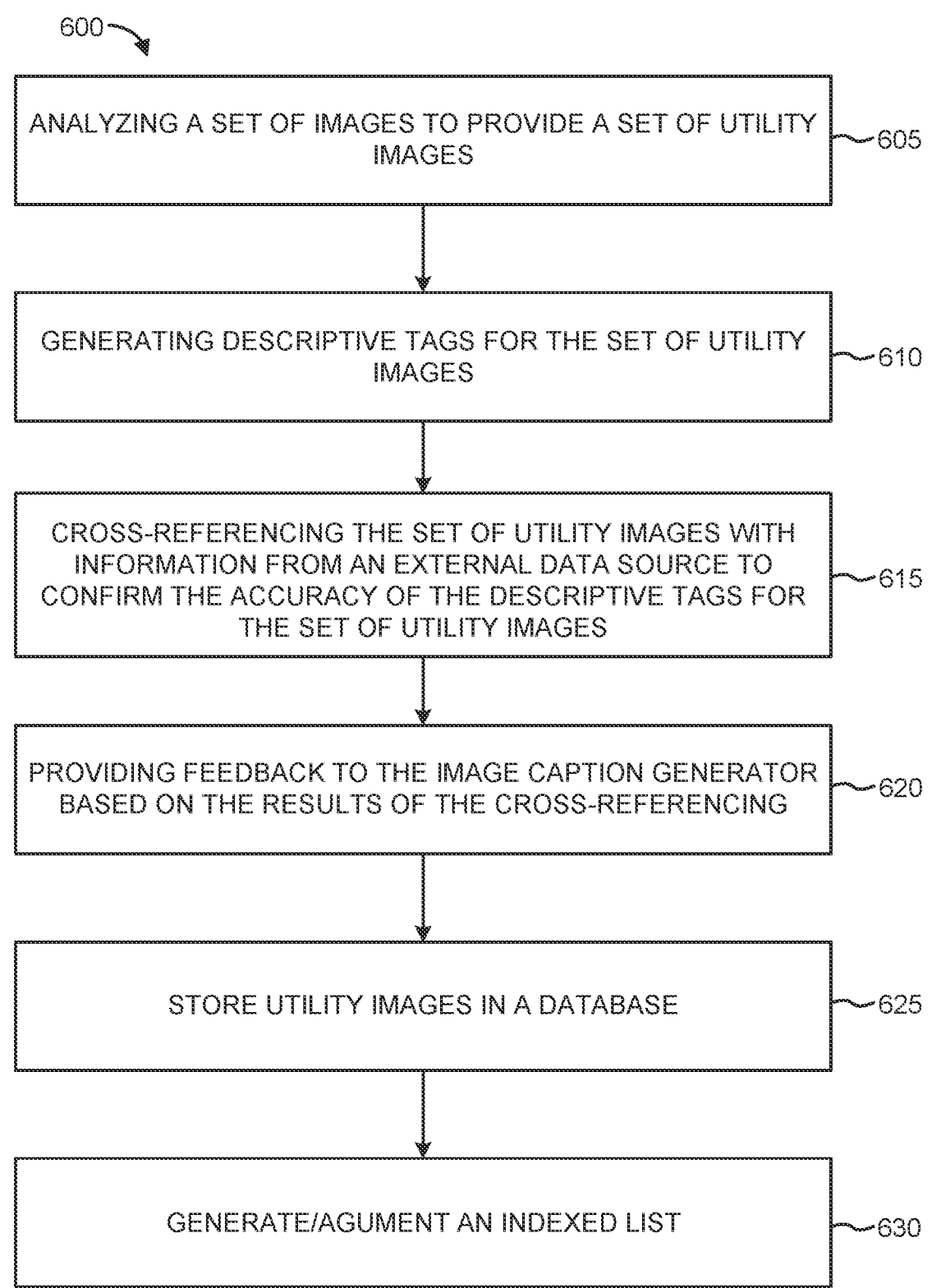
FIG. 6 illustrates a flow diagram of an example method for processing images.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 6 illustrates a flow diagram of an example method 600 for processing images. The method 600 could be implemented by the system 100 of FIG. 1. At block 605, an image caption generator (e.g., the image caption generator 140 of FIG. 1) executing on a computing platform analyzes a set of images of a region of an environment captured during or after an environmental emergency event to provide a set of utility images selected from the set of images that include a utility asset. The analyzing is based on parameters of an ML model employed by the image caption generator. At bock 610, the image capture generator generates descriptive tags for the set of utility images. The descriptive tags each characterize a type and a state of a respective utility asset included in a respective image of the set of utility images. The generating is based on the parameters of the ML model.

At block 615, a verification engine cross-references the set of utility images with information from an external data source to confirm the accuracy of the descriptive tags for the set of utility images. The external data source could be, for example, a GIS database that provides elevation models and topography information about a region. At 620, the verification engine provides feedback to the image caption generator based on the results of the cross-referencing. The image caption generator can adjust the parameters of the ML model based on the feedback to increase accuracy of the descriptive tags.

At 625, the image caption generator stores the set of utility images in a database. At 630, the image caption generator generates or augments an indexed list (e.g., the indexed list 160 of FIG. 1) for the set of utility images. The indexed list includes an ID, a corresponding descriptive tag and metadata (e.g., including location information) associated with each image in the set of utility images.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Also as used herein, the term "set" means one or more elements (e.g., where the elements can be anything, such as images, etc.), a "subset" of a set A refers to any set B where every element of set B is an element of set A (note that for every set A, set A is a subset of set A, as every element of set A is an element of set A), and a "proper subset" of a set A refers to a subset B of set A that is not set A, such that set A includes at least one element that is not in subset B. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions, the machine-readable instructions comprising:

an image caption generator causing at least one processor to execute operations based on parameters of a machine learning (ML) model, the operations of the image caption generator comprising:

analyzing a set of images of a region of an environment captured during or after an environmental emergency event to provide a set of utility images selected from the set of images that include a utility asset; and generating descriptive tags for the set of utility images, wherein the descriptive tags each characterize a type and a state of a respective utility asset included in a respective image of the set of utility images; and a verification engine causing the at least one processor to execute operations, the operations for the verification engine comprising:

cross-referencing the set of utility images with information from an external data source to confirm an accuracy of the descriptive tags for the set of utility images; and providing feedback to the image caption generator based on results of the cross-referencing, wherein the image caption generator adjusts the parameters of the ML model based on the feedback to increase accuracy of the descriptive tags.

2. The non-transitory machine-readable medium of claim 1, wherein the ML model includes a transformer-based neural network with an encoding component for converting images into numerical vectors and a decoding component for converting the numerical vectors into descriptive text for the descriptive tags.

3. The non-transitory machine-readable medium of claim 1, wherein the machine-readable instructions further comprise an image preprocessor that causes the at least one processor to execute operations, the operations for the image preprocessor comprising normalizing the images of the set of images by resizing the images of the set of images to a uniform size.

4. The non-transitory machine-readable medium of claim 1, wherein the operations of the image caption generator further comprises:

storing the set of utility images in a database; and generating an indexed list for the set of utility images comprising a unique identifier (ID) for each image of the set of utility images, a corresponding descriptive tag for each image in the set of utility images, a link to the database for each image of the set of utility images and metadata including location information associated with each image in the set of utility images.

5. The non-transitory machine-readable medium of claim 4, further comprising a user interface module causing the at least one processor to execute operations, the operations of the user interface module comprising providing a user interface for querying one or both of (i) the indexed list or (ii) the database based on specific criteria related to one or both of (i) the descriptive tags or (ii) the location information.

6. The non-transitory machine-readable medium of claim 5, wherein the user interface is configured to display images on a map based on the location information and enable filtering images by one or both of (i) specific types of damage or infrastructure elements identified in the descriptive tags the set of utility images.

7. The non-transitory machine-readable medium of claim 5, wherein the user interface enables search criteria based on an employee role, the user interface provides images of the set of utility images and associated data relevant to the employee role.

8. The non-transitory machine-readable medium of claim 1, wherein the operations of the image caption generator further comprise flagging images in the set of utility images that lack location information.

9. The non-transitory machine-readable medium of claim 1, wherein the external data source is geographic information system (GIS) data, including elevation models and topography information.

10. The non-transitory machine-readable medium of claim 1, the machine-readable instructions comprising a ticket system interface causing the at least one processor to execute operations, the operations for the ticket system interface comprising automatically generating an investigation request for a ticket manager in response to receiving a particular image of the set of utility images being generated a descriptive tag characterizing a failure state of a utility asset in the particular image, wherein the investigation request includes location information for the particular image.

11. The non-transitory machine-readable medium of claim 1, wherein operations of the image caption generator further comprise assigning a descriptive tag of images in the set of utility images a confidence score, wherein the verification engine is configured to cross-reference images having a confidence score below a threshold with external GIS geographic information system (GIS) data retrieved from the external data source.

12. A system for analyzing images, the system comprising:

a non-transitory memory for storing data and machine-readable instructions; and a processor for accessing the non-transitory memory and executing the machine-readable instructions, the machine-readable instructions comprising:

an image preprocessor for receiving a set of images of a region of an environment captured during or after an environmental emergency event from a plurality of sources;

an image caption generator employing a machine learning (ML) model for:

analyzing the set of images to identify a set of utility images selected from the set of images that include a utility asset; and generating descriptive tags for the set of utility images, wherein the descriptive tags each characterize a type and a state of a respective utility asset included in a respective image of the set of utility images;

a database for storing the set of utility images and associated descriptive tags; and a verification engine for cross-referencing the images of the set of utility images with external geographic information system (GIS) data to confirm an accuracy of the descriptive tags of the set of utility images and to provide feedback to the image caption generator for adjustment of parameters of the ML model.

13. The system of claim 12, wherein the image caption generator is further for generating an indexed list for the set of utility images comprising a unique identifier (ID) for each image of the set of utility images, a corresponding descriptive tag for each image in the set of utility images and metadata including location information associated with each image in the set of utility images.

14. The system of claim 13, wherein the machine-readable instructions stored in the non-transitory memory further comprise a user interface module for providing a user interface for filtering the indexed list based on specific criteria related to the descriptive tags and location information embedded in the set of utility images.

15. The system of claim 14, wherein the user interface displays images on a map based on the location information and the specific criteria enables filtering images by one or both of (i) specific types of damage or (ii) infrastructure elements identified in the descriptive tags of the set of utility images.

16. The system of claim 15, wherein the machine-readable instructions stored in the non-transitory memory further comprise a ticket system interface for automatically generating an investigation request for a ticket manager responsive to receiving a particular image of the set of utility images that has a descriptive tag characterizing a failure state of a utility asset in the particular image, wherein the investigation request includes location information for the particular image.

17. The system of claim 12, wherein the image caption generator is further for assigning a descriptive tag of images in the set of utility images a confidence score, and the verification engine is configured to cross-reference images having a confidence score below a threshold with the external GIS data.

18. A method for processing images comprising:

analyzing, by an image caption generator executing on one or more computing platforms a set of images of a region of an environment captured during or after an environmental emergency event to provide a set of utility images selected from the set of images that include a utility asset, wherein the analyzing is based on parameters of a machine learning (ML) model employed by the image caption generator;

generating, by the image caption generator, descriptive tags for the set of utility images, wherein the descriptive tags each characterize a type and a state of a respective utility asset included in a respective image of the set of utility images, and the generating is based on the parameters of the ML model;

cross-referencing, by a verification engine executing on the one or more computing platforms, the set of utility images with information from an external data source to confirm an accuracy of the descriptive tags for the set of utility images; and providing feedback, by the verification engine, to the image caption generator based on results of the cross-referencing, wherein the image caption generator adjusts the parameters of the ML model based on the feedback to increase accuracy of the descriptive tags.

19. The method of claim 18, wherein the ML model includes a transformer-based neural network with an encoding component for converting images into numerical vectors and a decoding component for converting the numerical vectors into descriptive text for the descriptive tags.

20. The method of claim 18, further comprising:

storing, by the image caption generator, the set of utility images in a database; and generating, by the image caption generator, an indexed list for the set of utility images comprising a unique identifier (ID) for each image of the set of utility images, a corresponding descriptive tag for each image in the set of utility images and metadata including location information associated with each image in the set of utility images.

\* \* \* \* \*